UNITED STATES PATENT OFFICE.

JAKOB WEYLAND, OF ST. GALL, SWITZERLAND, ASSIGNOR TO CASPAR FRIEDRICH HAUSMANN, OF SAME PLACE.

CAPSULE.

SPECIFICATION forming part of Letters Patent No. 629,141, dated July 18, 1899.

Application filed August 17, 1897. Serial No. 648,575. (Specimens.)

*To all whom it may concern:*

Be it known that I, JAKOB WEYLAND, doctor of philosophy, a subject of the King of Bavaria, residing in St. Gall, Switzerland, have invented new and useful Improvements in Intestinal Capsules, (which have been patented in Germany by Letters Patent No. 85,807, dated August 14, 1895, and in Switzerland by Letters Patent No. 11,197, dated October 29, 1895,) of which the following is a full, clear, and exact description.

Gelatine can be rendered insoluble in water by the action of aldehydes of the fatty series—such as formic aldehyde, allyl aldehyde, or acrolein, &c. This has been known before my invention.

I have experimented upon the relations of the digestive ferments or juices to gelatine treated or hardened in the above-described manner, and I have found that gelatine so treated is soluble in pancreatic fluid if the hardening process be interrupted at the proper moment. Gastric juice or pepsin, however, has practically no action on gelatine so treated. This peculiar property of hardened gelatine I make use of for medicinal purposes by inclosing in capsules of such gelatine medicines which are not to be absorbed or assimilated until they enter the small intestine.

The manufacture of these intestinal capsules is effected as follows: Gelatine capsules containing any desired solid or liquid medicine are immersed in a solution of one of the above-named aldehydes (0.5 to 2 per cent. solution, according to the thickness of the gelatine capsules) and are left therein for from five to twenty minutes, according to requirements, after which the said capsules are dried at a heat of from 30° to 50° centigrade. The capsules so treated are practically insoluble in warm water and in gastric juice, but can be dissolved by pancreatic fluid in from one to three hours, according to the degree to which the gelatine has been hardened.

I am aware that it has been proposed to make intestinal capsules which will withstand the stomach juices, but will yield to the action of intestinal juices from a compound of keratine, shellac, and colophone, and this I do not claim. These capsules are not medically indifferent, while mine are practically inert or without appreciable medical effect.

Having thus described my invention, I claim—

1. A capsule of hardened gelatine, containing a medicament for the intestines, which capsule is insoluble in the gastric juices but readily soluble in the pancreatic fluids, substantially as set forth.

2. A gelatine capsule containing a medicament for the intestines, which is made insoluble in the gastric juices by treatment with an aldehyde of the fatty series, substantially as set forth.

3. A gelatine capsule containing a medicament for the intestines, which capsule is made insoluble in the gastric juices by treatment with formic aldehyde, the said capsule being, however, readily soluble in the pancreatic fluids, substantially as set forth.

4. A capsule of hardened gelatine, containing a fluid medicament for the intestines, which capsule is insoluble in the gastric juices but readily soluble in the fluids, substantially as set forth.

5. A gelatine capsule to contain a medicament for the intestines, which is made insoluble in the gastric juices by treatment with an aldehyde of the fatty series, substantially as set forth.

6. A gelatine capsule containing a fluid medicament for the intestines, which capsule is made insoluble in the gastric juices by treatment with formic aldehyde, the said capsule being, however, readily soluble in the pancreatic fluids, substantially as set forth.

In witness whereof I have hereunto signed my name in the presence of two subscribing witnesses.

JAKOB WEYLAND.

Witnesses:
KARL SCHWAMBERGER,
FRIEDRICH PENSELER.